(12) United States Patent
Helot et al.

(10) Patent No.: US 7,328,880 B2
(45) Date of Patent: Feb. 12, 2008

(54) STABILIZING SYSTEM FOR COMPUTER HARDWARE

(75) Inventors: Jacques H Helot, Grenoble (FR); Gilbert Rahmouni, Claix (FR)

(73) Assignee: Hewlett-Packard Development Company, L.P., Houston, TX (US)

(*) Notice: Subject to any disclaimer, the term of this patent is extended or adjusted under 35 U.S.C. 154(b) by 70 days.

(21) Appl. No.: 10/262,598

(22) Filed: Sep. 30, 2002

(65) Prior Publication Data

US 2003/0075664 A1 Apr. 24, 2003

(30) Foreign Application Priority Data

Oct. 1, 2001 (EP) .................................. 01410125

(51) Int. Cl.
*A47B 91/00* (2006.01)
(52) U.S. Cl. .............................. 249/346.01; 248/188.3; 248/349.1; 248/917; 312/223.2; 361/681; 361/682; 292/13
(58) Field of Classification Search .............. 248/188.1, 248/188.2, 688, 349.1, 188.8, 917–923, 188.3, 248/685, 677, 222.11, 222.12, 222.52, 346.01, 248/655, 666; 312/223.2, 351.1; 403/348, 403/349, 321, 322.1, 322.3, 325; 411/549, 411/550, 551, 552, 553; 292/13, 17, 19, 292/20, 91, 83; 361/681, 682, 683

See application file for complete search history.

(56) References Cited

U.S. PATENT DOCUMENTS

| | | | | |
|---|---|---|---|---|
| 2,949,984 A | * | 8/1960 | Daniels ..................... | 52/126.7 |
| 3,043,641 A | * | 7/1962 | Hanmore ................. | 248/188.5 |
| 3,393,846 A | * | 7/1968 | Cannon et al. ............ | 224/540 |
| 3,715,996 A | * | 2/1973 | Rolfshus ..................... | 297/311 |
| 3,879,084 A | * | 4/1975 | Jones ..................... | 297/174 R |
| 4,053,082 A | * | 10/1977 | Ullman ....................... | 220/3.6 |
| 4,505,408 A | * | 3/1985 | Sagol ....................... | 222/185.1 |
| 4,955,873 A | * | 9/1990 | Rajlevsky ................... | 604/322 |
| 5,297,003 A | * | 3/1994 | Nomura et al. ............ | 361/680 |
| 5,307,238 A | * | 4/1994 | Marcus ....................... | 361/681 |
| 5,310,156 A | * | 5/1994 | Matsumura et al. ........ | 248/615 |
| 5,388,792 A | | 2/1995 | Hastings et al. | |

(Continued)

OTHER PUBLICATIONS

"Pivoting Foot;" IBM Technical Disclosure Bulletin, IBM Corp.; New York, U.S.A.; vol. 31, No. 6; Nov. 1, 1998; pp. 228-230.

*Primary Examiner*—Kimberly Wood

(57) ABSTRACT

Disclosed is a stabilizing system for a unit having a horizontal and vertical orientation, the chassis cover including at least one wall panel incorporating a recess and a stabilizer adapted to be located in the recess, where the recess is adapted so that in a retracted position the stabilizer is substantially contained within the recess and, in an extended position, the stabilizer extends from the recess in such a way so as to stabilize the chassis when the chassis is mounted in a vertical orientation, wherein the stabilizer is moved into and locked into the extended or stabilizing position by means of a combined extension and rotation action. The stabilizing system may be used to stabilize vertically mounted computer hardware and may be constructed in a variety of ways depending on the style, design, size and type of casing which is to be supported. Partial threads are preferably formed in an engagement portion for positioning the stabilizer in a recess and causing it to automatically position itself in a stabilized position when the locking controls are released.

18 Claims, 10 Drawing Sheets

U.S. PATENT DOCUMENTS

| | | |
|---|---|---|
| 5,601,219 A * | 2/1997 | Chen .......................... 223/85 |
| 5,865,408 A * | 2/1999 | Swisher et al. .......... 248/188.1 |
| 5,934,774 A | 8/1999 | Wu et al. |
| 6,288,893 B1 | 9/2001 | Faranda et al. |
| 6,311,941 B1 * | 11/2001 | Feldmeyer ............... 248/188.8 |
| 6,472,626 B2 * | 10/2002 | Hayes ........................ 200/333 |
| 6,603,656 B2 * | 8/2003 | Cho et al. ................... 361/683 |
| 6,604,831 B1 * | 8/2003 | Prestigomo et al. ........ 353/119 |
| 6,636,418 B1 * | 10/2003 | Claprood et al. ........... 361/600 |

\* cited by examiner

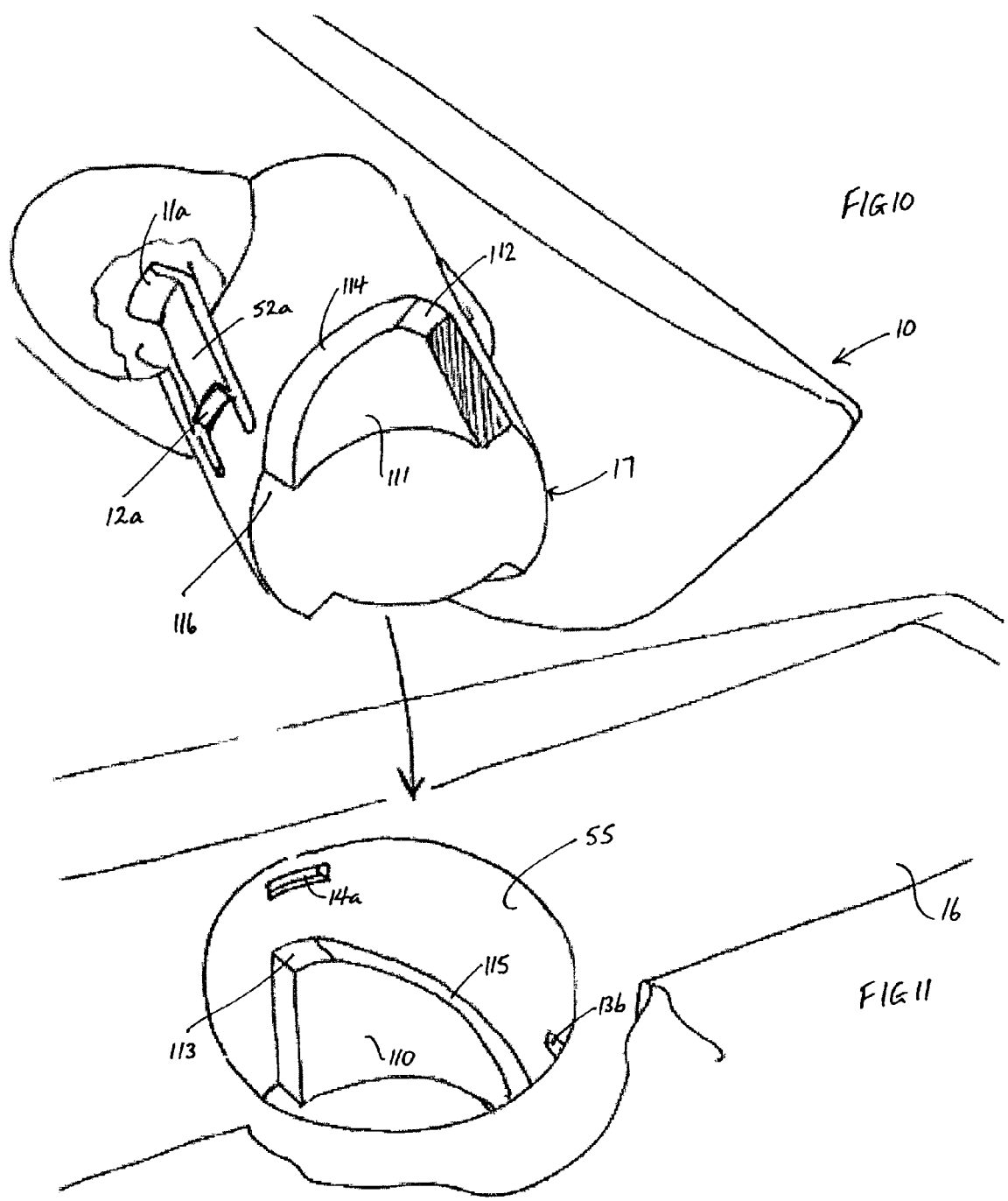

STABILIZING SYSTEM FOR COMPUTER HARDWARE

TECHNICAL FIELD

The present invention relates to apparatus for mounting and/or stabilizing computers and computer related hardware. More particularly, although not exclusively, this invention relates to devices for mounting and/or stabilizing desktop, portable and small form-factor computers in orientations which ensure that necessary operating functions such as cooling etc are not compromised.

BACKGROUND ART

Traditional designs for personal computers have evolved from the 'standard' personal computer, exemplified by the IBM-AT, to small form-factor PCs such as the e-PC manufactured by Hewlett Packard Company. This design development has resulted in many innovative and creative designs solutions reflecting the acceptance of such hardware in the business and home environment. This evolution in design has also been influenced by aesthetic considerations which were previously considered secondary to the basic task of housing the internal computer hardware in a functional casing unit.

Early types of personal computers were generally characterized by a horizontally mounted motherboards resulting in a quite low case profile with a relatively large footprint. This was necessitated by the PC case needing to be sufficiently large to accommodate motherboard, disk drives, power supplies etc. Early expansion board topologies reinforced the popularity of this type of case construction. However such designs consumed a significant amount of desk or floor space and a number of design solutions were proposed to reduce the PC footprint.

Early adaptations of known PC designs aimed at reducing the PC footprint included mounting the PC case on its side. Such solutions often involved simply tilting a standard PC on its edge, or constructing the case and chassis in a vertical orientation. Designs of the latter type are referred to as 'tower' configurations and sometimes involve the redesign of the computers internal hardware topology to accommodate this orientation.

A common problem with such configurations is that upright or slim line computer cases can be unstable and prone to tipping over. This is particularly so when the computer is located on the floor or perhaps where additional hardware components, for example external disk drives etc, are located on top of the computer case.

Early simple solutions included providing a separate resilient plastic 'foot' device in the form of a cradle into which the edge-mounted PC case could be slid. Such designs are not ideal as PC cases come in a variety of dimensions and not all feet can accommodate every model of PC. Other solutions include integrally molding into the base of the tower case, an outwardly oriented flange or rim. Others include incorporating molded or extruded rails mounted along the edge of the computer casing to extend the footprint slightly. Such methods can increase the footprint and improve stability. However, they may not be ideal as they often do not provide sufficient stability and flexibility in terms of operating functions (cooling etc). These modifications can also interfere with aesthetic aspects or the casing as well as hamper the ability to quickly and easily re-orient the computer in a horizontal or vertical position.

More recent solutions include stabilizer constructions in the form of a casing-wall section which, when rotated, extends the casing face outwardly forming a flat "foot" protruding from either side of the machine. This configuration leaves the computer case flush with the floor or desktop and requires significant engineering to incorporate the pivoting foot into the casing wall. Further, the construction of this type of foot is such that its' width (in the lateral direction of the PC case), is approximately the same as the height of the PC case when the case is lying flat. This width does not contribute to the stability of the PC case when the foot is extended and may complicate the internal construction of the case. Such a construction may also be problematic in situations where cooling vents or intakes would be obscured when the PC is mounted in the upright or vertical position with the foot extended. The foot construction described above does not allow through-wall cooling of components located adjacent the lower PC case wall.

Very small footprint PCs such as the e-PC manufactured by Hewlett Packard Company, are constructed with a relatively flat profile and can be oriented vertically or horizontally. The stability of such computers can be enhanced with careful distribution of weight via component location within the casing. However it remains desirable to augment the stability of such computer form-factors with additional stabilizing devices. As noted above, separate foot components may be used, however these can suffer the same drawbacks as for PCs with conventional dimensions.

It is an object of the present invention to provide for a means and device for stabilizing a PC or computer equipment which is aesthetically pleasing, non-intrusive, compact, solid, easy to retract/extend and which allows through-wall cooling through the underside of the vertically mounted computer or hardware component casing.

DISCLOSURE OF THE INVENTION

In one aspect the present invention provides for a chassis cover for a unit having a horizontal and vertical orientation, the chassis cover preferably including:
  at least one wall panel incorporating a recess;
  a stabilizer adapted to be located in the recess, where the recess is adapted so that in a retracted position the stabilizer is substantially contained within the recess and, in an extended position, the stabilizer extends from the recess in such a way so as to stabilize the chassis when the chassis is mounted in a vertical orientation, wherein the stabilizer may be moved into and locked into the stabilizing position by means of a combined extension and rotation action.

The stabilizer may be mounted within the recess by means of an engagement portion adapted to engage with a correspondingly shaped engagement surface in the recess.

The engagement portion is preferably in the shape of a cylinder.

The engagement portion may incorporate at least one locking means which, when the stabilizer is in the retracted configuration, engages with a corresponding first retention means in the engagement surface and, when in the stabilizer is in an extended configuration, engages with corresponding second retention means in the engagement surface.

The locking means preferably corresponds to a locking tab.

The first and second retention means may correspond to slots, surfaces or other features adapted to releasably engage with the locking means when said locking means is moved into a first and second engagement position respectively.

The one or more locking means may be biased so that when said locking means are in registration with the first or second retention means, it is biased into engagement with the first or second retention means respectively.

The one or more locking means may preferably be adapted to engage with the first and second retention means by means of at least one protruding retention tab which is adapted to removably engage with said first and second retention means in the engagement surface.

The one or more locking means are preferably adapted so that they each include a locking control which:
when operated in the retracted position, disengages the one or more locking means from corresponding first retention means thereby allowing the stabilizer to be extracted from the recess and locked into the stabilizing position by means of biased engagement of the locking means with corresponding second retention means; and
when operated in the stabilizing position, disengages the one or more locking means from corresponding second retention means thereby allowing the stabilizer to be inserted into the recess and locked into the retracted position by means of biased engagement of the one or more locking means with corresponding first retention means.

The engagement portion may be hollow and the one or more locking means formed from partially cut away sections shaped so as to form a hinge section adjacent an inner end of the engagement portion and the locking control adjacent an outer end of the engagement portion.

Ideally there are two locking means located on opposite sides of the engagement means.

The second retention means preferably incorporates a first and second stage locking mechanism adapted so that when the locking means engages with the first stage locking mechanism it is fixed in the extended position but able to rotate substantially freely and when the stabilizer is rotated into a predetermined position it engages with the second stage locking mechanism and is locked in place.

The first and second stage locking mechanism preferably correspond to recessed slots having first and second depths respectively and where the first slot extends around an inner surface of the engagement surface so that when the locking means is engaged with the second stage locking mechanism the stabilizer is capable of free rotational movement.

The second stage locking mechanism preferably corresponds to a slot of second, deeper, depth adapted and located so that when the stabilizer is rotated into the stabilizing position it engages with the second stage locking mechanism.

The stabilizing position preferably corresponds to the stabilizer being oriented at substantially 90 degrees to a plane defined by the unit when in the vertical position.

In an alternative embodiment, the stabilizer and the recess may each incorporate threaded sections adapted to engage in such a way that when the stabilizer is inserted into the recess, it rotates into a storage position without any user intervention.

Each threaded section may incorporate at least one land adapted to transmit the weight of the unit to the stabilizer when the stabilizer is in the stabilizing position.

The engagement means as hereinbefore defined preferably has a partial thread formed therein and adapted to engage in a slideable rotating engagement with a corresponding partial thread in the engagement surface.

Each partial thread preferably includes a corresponding land which, in the stabilizing position, serves to transmit the weight of the unit to the foot.

The lands are preferably in the form of substantially flat portions of the partial thread, oriented and positioned to provide coacting bearing surfaces when the unit is in the stabilizing position.

In yet an alternative embodiment, the stabilizer may include at least one post and the recess includes at least one corresponding first slot, the post and first slot adapted to engage so as to orient and position the stabilizer in both the retracted and stabilized position depending on the degree of retraction of the stabilizer from the recess.

Such a stabilizer preferably incorporates two posts and the recess two corresponding slots, wherein the posts and slots are arranged so that as the stabilizer is extracted from the recess, it rotates from the retracted position into the stabilized position.

The slots preferably form a helical path which causes the stabilizer to rotate as it traverses the engagement recess.

Preferably the chassis cover includes second slots traversing the length of the recess and adapted to allow the stabilizer to be located in the recess whereupon a small rotation of the stabilizer causes the posts to engage with the corresponding first slots.

The second slots may be positioned so that the posts do not re-engage with the first slots if the stabilizer is retracted in a non-rotating manner.

The chassis cover may include a biasing means adapted to bias the stabilizer out of the recess.

The invention also provides for a stabilizer for a computer which is adapted to be located in a recess in a computer casing such that in a retracted position the stabilizer is substantially contained within the recess and, in an extended position, the stabilizer extends from the recess in such a way so as to stabilize the chassis when the computer is mounted in a vertical orientation, wherein the stabilizer is adapted so that it is moved into and locked into the stabilizing position by means of a combined extension and rotation action.

The stabilizer may include an engagement portion which is adapted to engage with a correspondingly shaped engagement surface in the recess.

The engagement portion is preferably in the shape of a cylinder.

The engagement portion preferably incorporates at least one locking means which is adapted so that when the stabilizer is in the retracted configuration, engages with a corresponding first retention means in the engagement surface and, when in the stabilizer is in an extended configuration, engages with a corresponding second retention means in the engagement surface.

The locking means preferably corresponds to a locking tab.

The one or more locking means is preferably biased so that when said one or more locking means are in registration with the first or second retention means, the one or more locking means are biased into engagement with the first or second retention means respectively.

The one or more locking means preferably is adapted to engage with the first and second retention means by means of at least one protruding retention tab which is adapted to removably engage with said first and second retention means in the engagement surface.

Preferably the one or more locking means include a locking control which:
when operated in the retracted position, disengages the one or more locking means from corresponding first retention means thereby allowing the stabilizer to be extracted from the recess and locked into the stabilizing position by means of biased engagement of the locking means with corresponding second retention means; and when operated in the stabilizing position, disengages the one or more locking means from corresponding second retention means thereby allowing the, stabilizer to be inserted into the recess and locked into the retracted position by means of biased engagement of the one or more locking means with corresponding first retention means.

The engagement portion is preferably hollow and the one or more locking means are preferably formed from partially cut away sections shaped so as to form a hinge section adjacent a distal end of the engagement portion and the locking control adjacent an proximal end of the engagement portion.

The stabilizer as hereinbefore defined preferably includes two locking means located on opposite sides of the engagement means.

Preferably the second retention means incorporates a first and second stage locking mechanism adapted so that when the one or more locking means engages with the first stage locking mechanism the stabilizer is fixed in the extended position but able to rotate substantially freely and when the stabilizer is rotated into a predetermined position in relation to the recess, it engages with the second stage locking mechanism and is locked in place.

The first and second stage locking mechanism preferably corresponds to recessed slots having first and second depths respectively, where the first slot extends around an inner surface of the engagement surface so that when the one or more locking means is engaged with the first stage locking mechanism the stabilizer is capable of free rotational movement.

The second stage locking mechanism preferably corresponds to a slot of second, deeper, depth adapted and located so that when the stabilizer is rotated into the stabilizing position it engages with the second stage locking mechanism and is locked in place.

The stabilizing position preferably corresponds to the stabilizer being oriented at substantially 90 degrees to a plane defined by the computer when in the vertical position.

The stabilizer as hereinbefore defined may be adapted for use with a chassis as hereinbefore defined.

BRIEF DESCRIPTION OF THE DRAWINGS

The present invention will now be described by way of example only and with reference to the drawings in which:

FIG. 10: illustrates a perspective view of an embodiment of a male part of an engagement means from below;

FIG. 11: illustrates a perspective view of an embodiment of a female part of an engagement means corresponding to the part shown in FIG. 10;

BEST MODE FOR CARRYING OUT THE INVENTION

Figure 6:
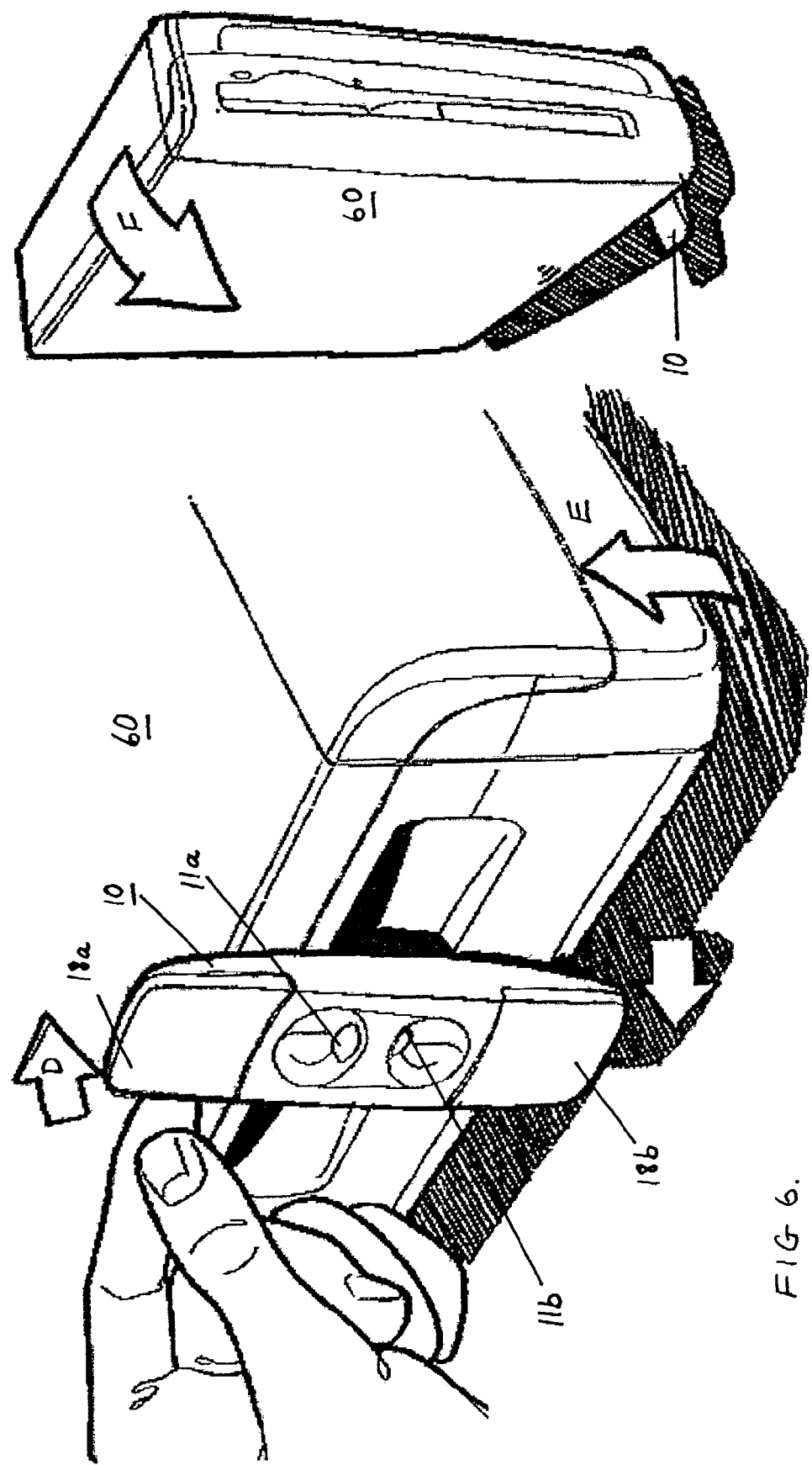
FIG. 6: illustrates a perspective view of a stabilizer in an extended position and a PC case stabilized by a stabilizer.

The right hand portion of FIG. 6 illustrates a design of computer 60 to which the present invention may be usefully applied. As discussed in the preamble to this specification, personal computers including those with small form factors are desirably oriented in a vertical position as shown in FIG. 6. The dimensions of such casing configurations and the mass of the desktop computer units are such that they can be easily tipped over and in cases where the casing cannot be arranged horizontally, some form of vertical stabilization is necessary.

Figure 2:
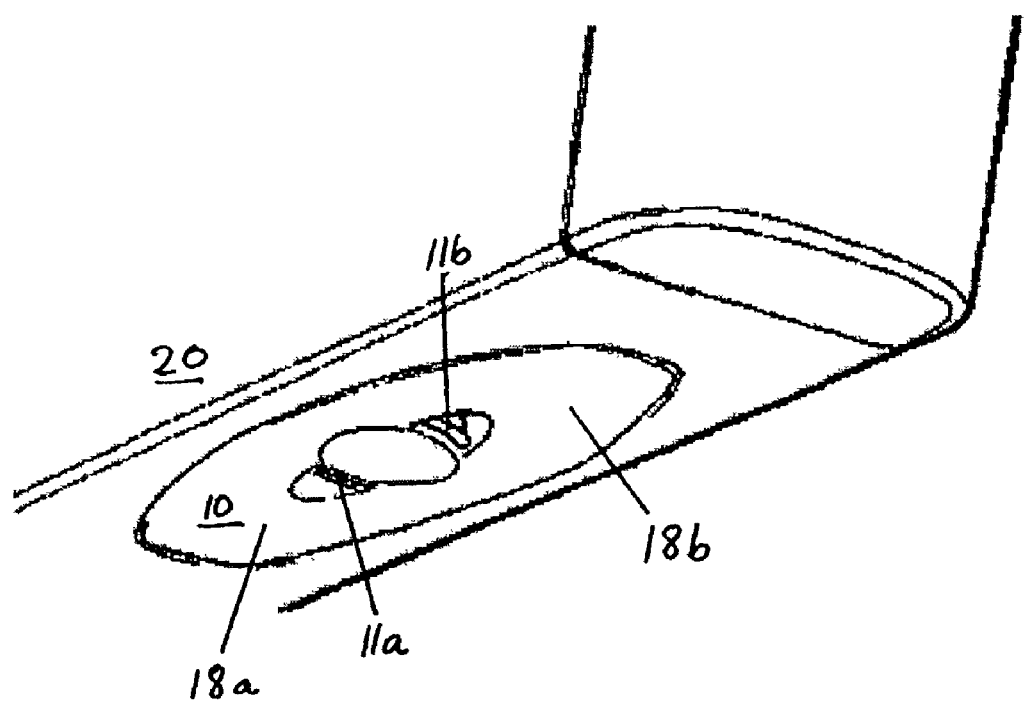
FIG. 2: illustrates an underside perspective of a side wall with a stabilizer in a retracted position.
Figure 3:
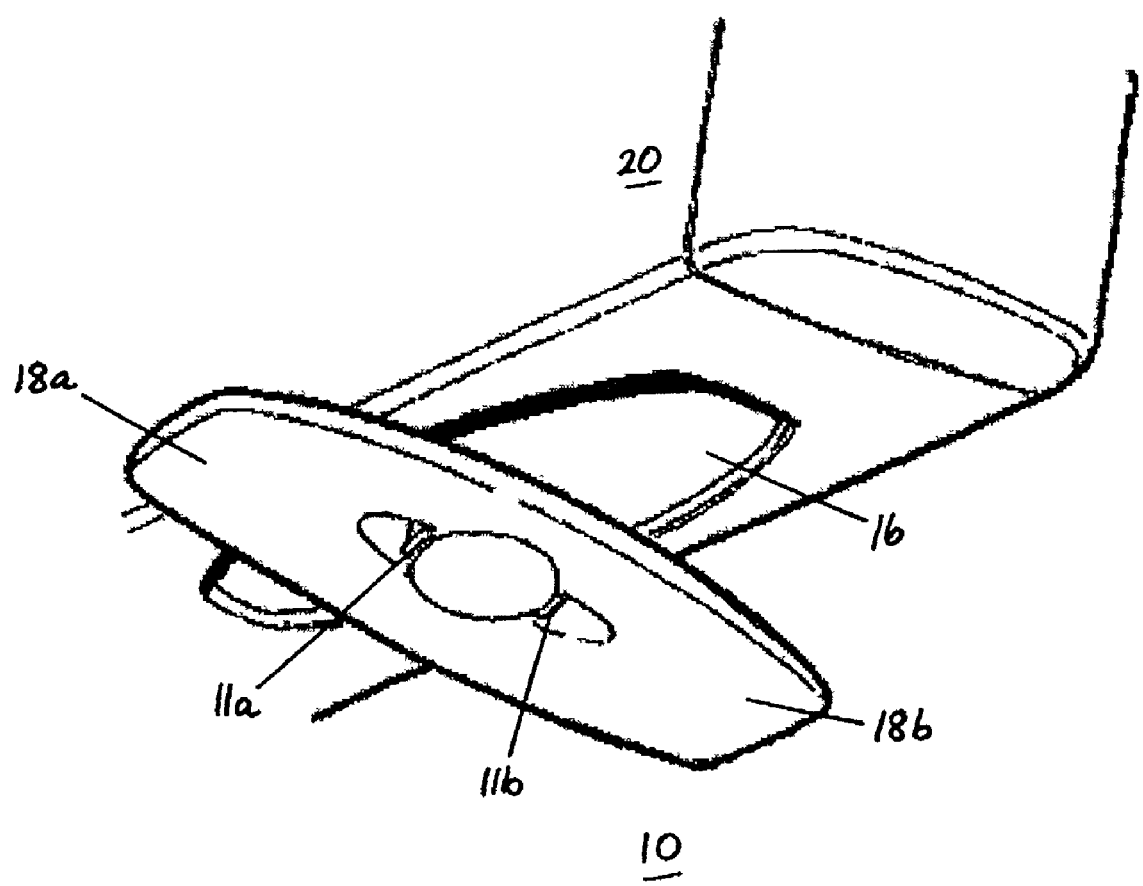
FIG. 3: illustrates an underside perspective of a side wall with a stabilizer in an extended position.

Referring to FIGS. 2 and 3, a stabilizer 10 in accordance with a preferred embodiment of the invention is shown in the extended (FIG. 3) and retracted (FIG. 2) position. This embodiment corresponds to a simplified and generalized implementation of the present invention and it is noted that refinements including aesthetic and constructional variations are to be considered within the scope of the invention.

The stabilizer has a general construction whereby a foot (18a, 18b), may be stored in a retracted position (see FIG. 2) in the base of a computer casing 20 (see FIG. 3). In this configuration, the stabilizer 10 is rotated so,as to be congruent a suitably shaped recess 16 (see FIG. 3). In the stabilizing position, the stabilizer 10 is extended from the sidewall recess 16 and rotated in a plane parallel to the sidewall surface as shown in FIG. 3. A preferred and generally most stable configuration corresponds to that where the stabilizer foot (18a, 18b) is oriented perpendicularly to the lengthwise, or front-back axis, of the PC casing. This configuration can be seen from the underside in FIGS. 3 and 6.

Figure 5:
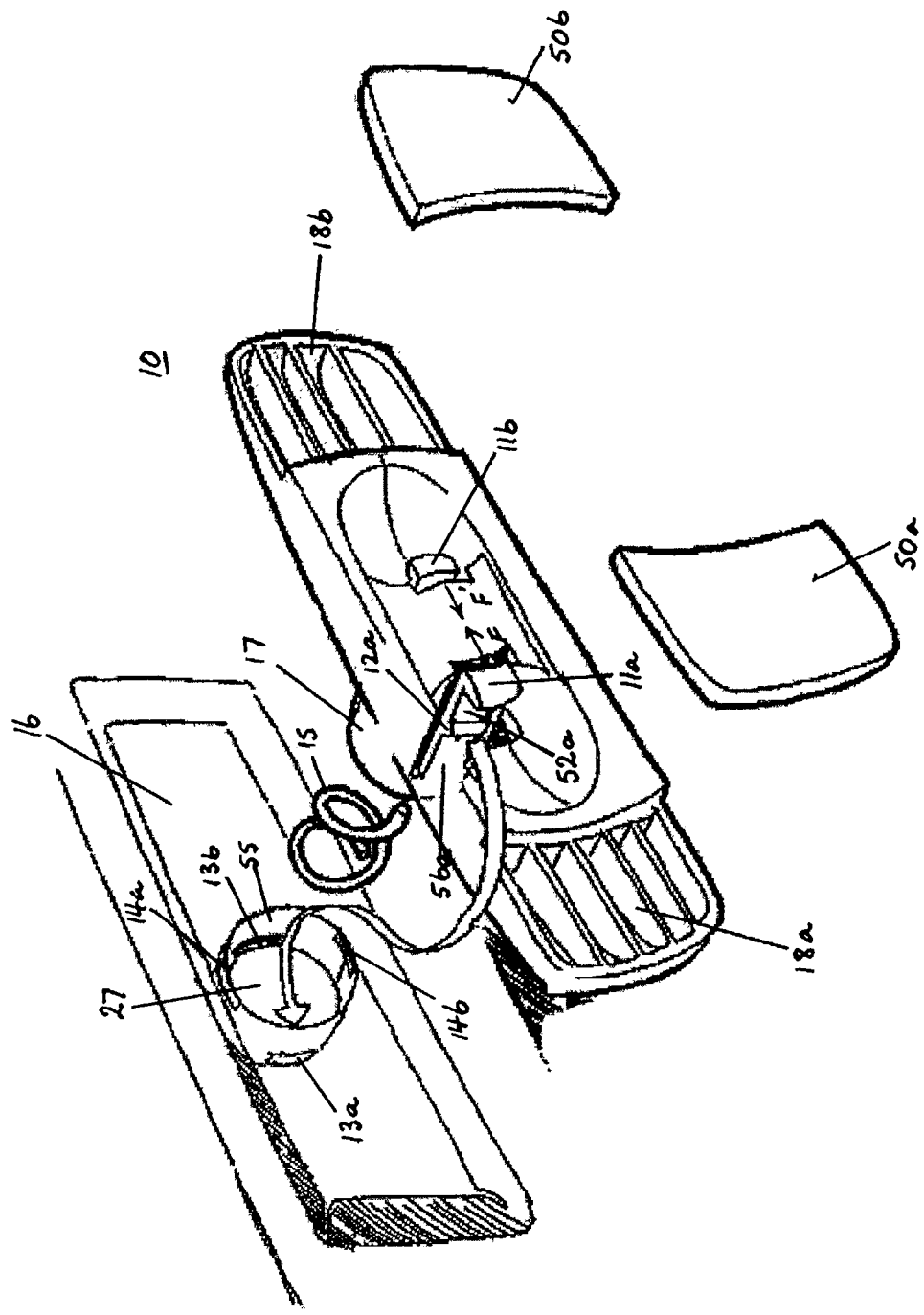
FIG. 5: illustrates an exploded perspective view of a stabilizer and sidewall with recess.

The locking state of the stabilizer 10 is controlled by means of an engagement portion, generally indicated by the numeral 17 in FIG. 5. The engagement portion has locking controls 11a and 11b. These can be seen in FIGS. 2, 3 and 5 as the two arc-shaped tabs protruding into finger-recesses formed in the underside of the stabilizer 10.

Figure 4:
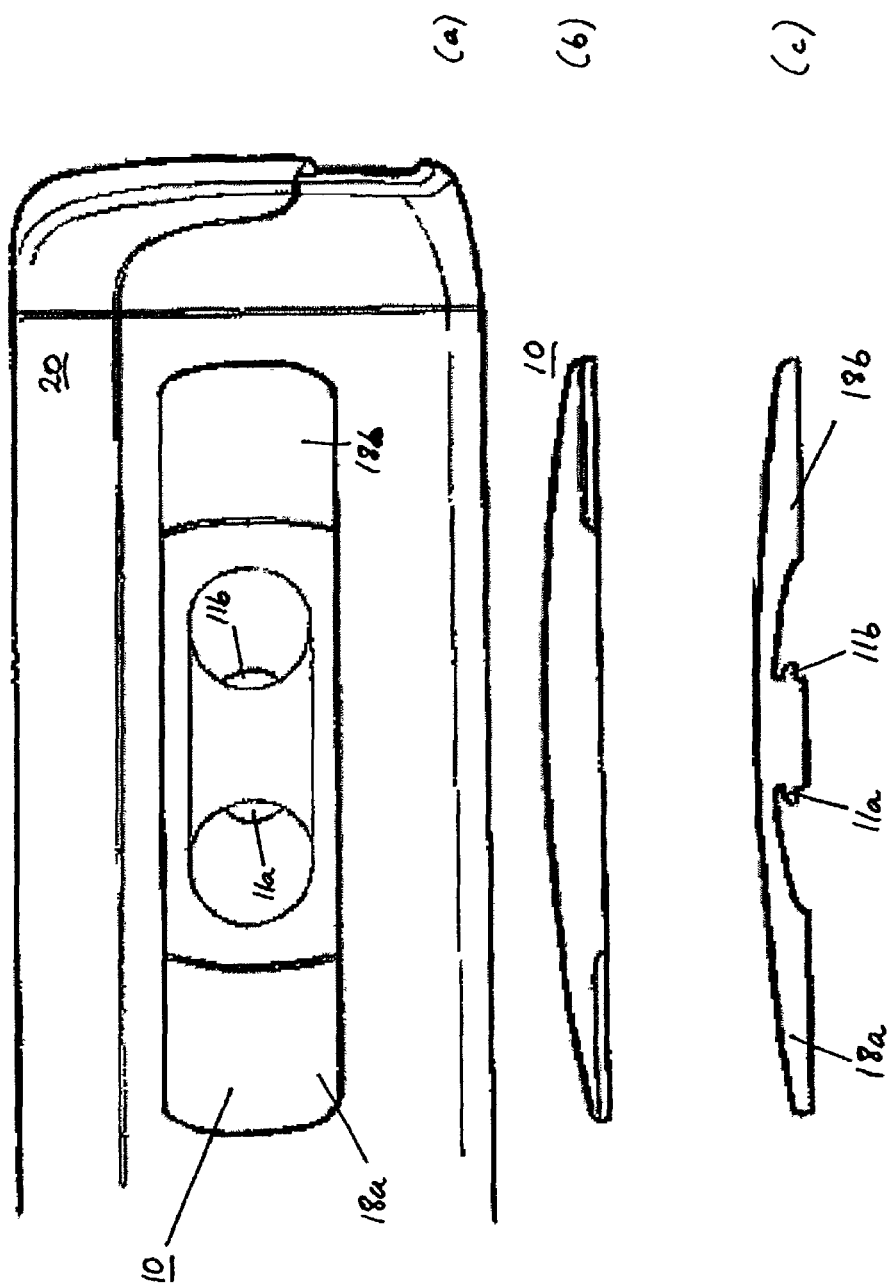
FIG. 4: illustrates an underside plan view (a) of a sidewall incorporating a stabilizer and, side view (b) and side cross-section view (c) of a stabilizer.

This, feature can be seen more clearly in the simplified embodiment illustrated in FIGS. 4a,b and c. Here the stabilizer 10 is generally rectangular in shape and includes feet 18a and 18b. The locking controls 11a and 11b are shown in finger recesses seen in the cross section in FIG. 4(c). In this example, the finger recesses are generally circular with the locking controls 11a,b adjacent the central engagement portion (not visible).

FIG. 5 illustrates a detailed example of a preferred embodiment of the present invention. The construction shown is a preferred example only and there may be other shapes and stabilizer arrangements which, while embodying the present invention, satisfy design, aesthetic and other requirements.

Referring to FIG. 5 a stabilizer 10 includes feet 18a and 18b; these feet are molded so as to be capable of receiving footpads 50*a* and 50*b*. These pads may be formed from a resilient substance such as rubber, felt or some other suitable material. These foot and pad combinations 18*a,b* and 50*a,b* form the stabilizing elements which stabilize the computer on its mounting surface.

The engagement portion 17 protrudes into and through the casing and engages with a correspondingly shaped engagement recess 55 (see FIG. 5). In a preferred embodiment, the engagement portion 17 is a substantially right-cylindrical member 17 out of which two elongate locking tabs 52*a* and 52*b* are formed. Locking tab 52*b* is obscured in FIG. 5.

As can be seen in FIG. 5, the locking tabs 52*a,b* are formed by cutting away portions of the side-walls of the cylindrical engagement portion 17 so that a bendable hinge portion 56*a* is formed at the end which connects the locking tabs 51*a,b* to the engagement portion 17. The locking tabs 52*a,b* are therefore oriented in a direction which is perpendicular to the plane of the side wall and can be operated by pressing the locking controls 11*a* and 11*b* in the direction F and F' respectively in FIG. 5.

The recess 16 in the sidewall is shaped to receive the stabilizer 10 as a whole so that when the stabilizer 10 is in the retracted position, the undersides of the pads 50*a* and 50*b* lie flush with or below the plane of the sidewall. In the retracted (and locked) position, the stabilizer 10 is oriented in the position shown in FIG. 5, parallel to the front-back axis of the computer casing.

The stabilizer 10 is substantially constrained within the recess defined by the surface 16 when the engagement portion 17 is fully inserted and locked into the correspondingly shaped engagement surface 55. In the present geometry, the engagement surface 55 is a recessed, open cavity such as that shown in FIG. 5. Alternatively, it may include a cylindrical central pillar section as illustrated by component 26 in FIG. 1. This latter construction is possibly stronger and, under certain circumstances, can help to center a suitably shaped engagement portion 17 within the engagement surface 55. Alternatively, the engagement portion 17 may protrude through a hole 27 (see FIG. 5) in the engagement surface. This allows sufficient lengthwise clearance so that in the retracted position the retention tabs 12*a,b* can engage with their corresponding retention slots 13*a,b*. Of course the depth of the engagement recess 55 and the length of the engagement portion 17 may vary depending on the specific construction of the foot locking mechanism.

Locking and unlocking the stabilizer 10 is described as follows.

When the stabilizer 10 is retracted into the recess 16 in the orientation shown in FIG. 5, retention tabs 12*a* and 12*b* located on the locking tabs 52*a,b* engage with retention slots 13*a* and 13*b* in the engagement recess 55.

In a preferred embodiment, this engagement is a snap-action resulting from a biasing force provided by flexing the locking tabs 52*a,b* around their corresponding hinge portions 56*a,b*. That is, when the stabilizer is inserted into the recess, the retention tabs 12*a,b* slide along the sides of the engagement surface 55 until they reach the retention slots 13*a,b*. At this point the outward biasing force causes the retention tabs 12*a,b* to snap outwardly into their corresponding retention slots 13*a,b*. The biasing force then locks the retention tabs 12*a,b* in engagement with the retention slots 13*a,b*. This secures the stabilizer 10 within the recess in the retracted position.

Figure 7:
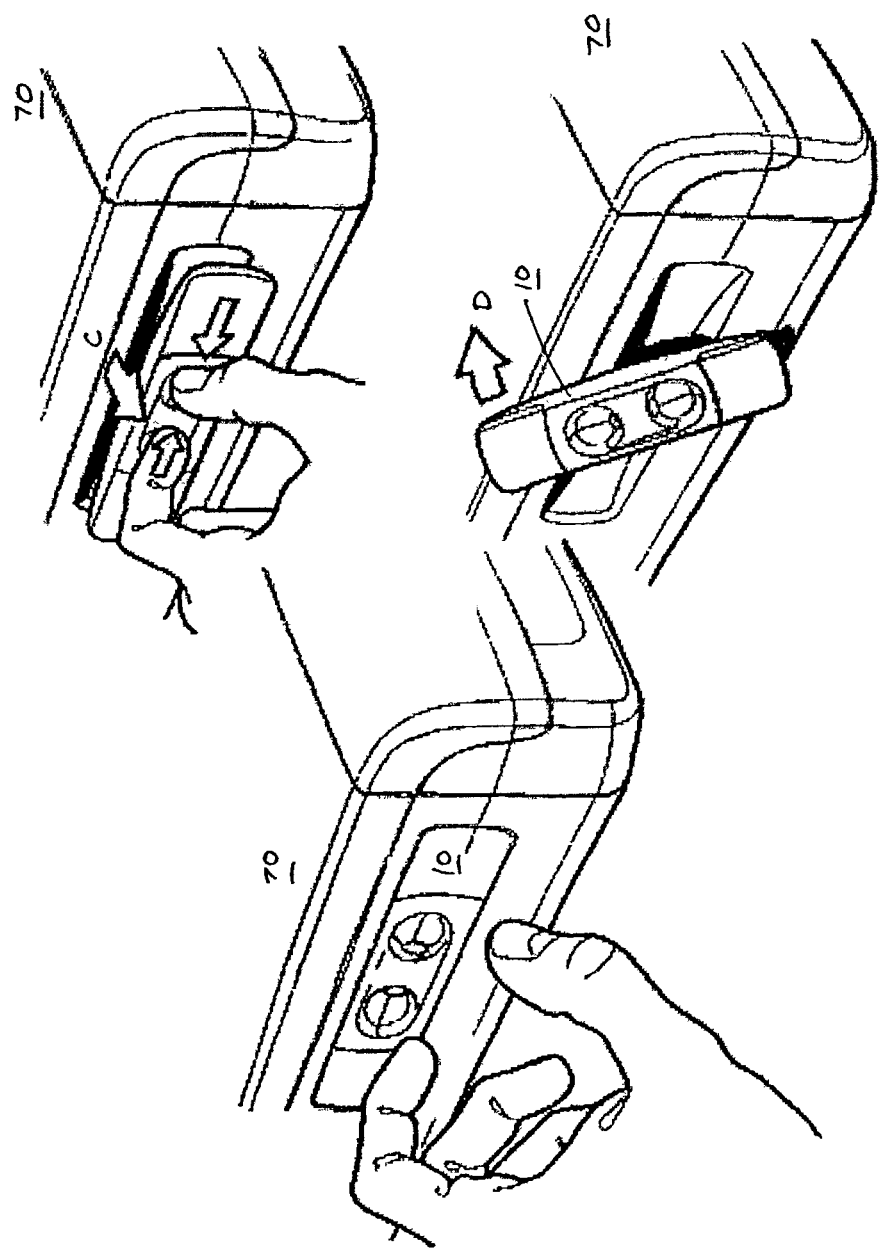
FIG. 7: illustrates retracting and extending a stabilizer.

To extract and extend the stabilizer, the locking controls 11*a* and 11*b* are pressed inwardly as shown in FIG. 7. This bends the locking tabs 52*a,b* and disengages the retention tabs 12*a,b* from the retention slots 13*a,b*. The stabilizer may then be slightly withdrawn from the recess 16 and rotated as shown by D in FIG. 7. As the stabilizer is withdrawn and rotated, the retention tabs 12*a,b* come into engagement with extension slots 14*a,b*. These are shown in FIG. 5 as single slots 14*a,b* which engage the retention tabs 12*a,b* when the stabilizer is withdrawn and rotated at right angles to the long axis of the PC case. In another embodiment (seen in cross section in FIG. 1), the extension slots 14*a,b* may extend completely around the lip of the recess 55. In this configuration the stabilizer 10, once withdrawn, locks into a fixed axial position in relation to the plane of the sidewall and may then be rotated into the desired stabilizing position (i.e.; through 90 degrees).

A spring 15 may be used to bias the stabilizer 10 out of the recess 16 so that when the user compresses the locking controls 11*a* and 11*b*, the stabilizer automatically "ejects" and then locks by means of the retention tabs 12*a,b* engaging with extension slots 14*a,b* in the rotatable or fixed stabilizing position shown in FIG. 7, bottom right.

Figure 1:
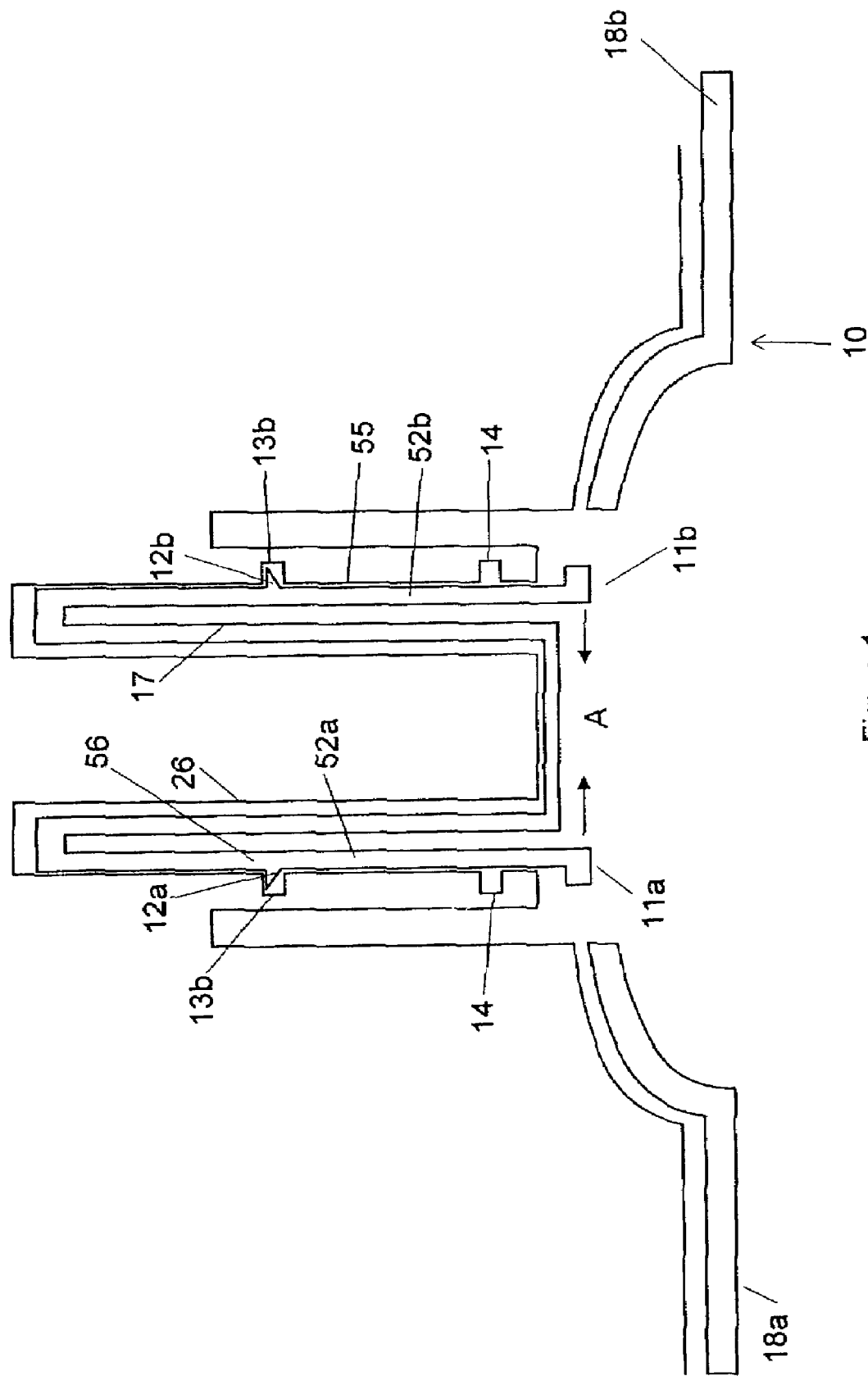
FIG. 1: illustrates a cross section in a lateral direction through a stabilizer and a side wall when the stabilizer is in a retracted position.

FIG. 1 shows an alternative construction in detailed cross-section through the recess 16 and stabilizer 10 when the stabilizer is in the retracted position.

Referring to FIG. 1, and as described above, the locking tabs 52*a,b* each have a retention tab 12*a,b* protruding therefrom. This retention tab 12*a,b* engages with retention slot 13 when the stabilizer is retracted, or with the extension slot 14 when the stabilizer is in an extended stabilizing position. When the locking controls 11*a* and 11*b* are compressed together in the direction A shown in FIG. 1, the retention tabs 12*a,b* disengage from the retention slots 13*a,b* and the compressed spring 15 pushes the engagement portion 17 out of the recess 55. As the engagement portion 17 and stabilizer move out of the recess, the retention tabs 12*a,b* snap into the extension slot 14. The position and configuration of the extension slot 14 may be such as to allow the stabilizer to rotate freely around an axis defined by the engagement portion 17 or only to lock when the stabilizer is rotated at right angles to the casing as in FIG. 5.

In an alternative embodiment, the extension slot 14 may have a stepped or two-stage locking shape including a shallow slot (not shown) running around the lip of the recess 55. This can be used to initially lock the stabilizer axially in the recess, but then allow it to rotate until it is in the stabilizing orientation whereby the retention tabs 12*a,b* snap into a secondary deeper locking slot (not shown). This two-stage locking mechanism may be desirable as it provides two levels of locking, the first on extraction of the stabilizer 10 from the casing so it can be rotated, and the second level corresponding to locking the stabilizer 10 into position at right-angles to the casing front-back axis. The operation of this embodiment is shown schematically in FIG. 7, where the stabilizer is retracted in the direction C, whereupon the retention tabs 12*a,b* snap into an annular (first) recess. On rotating the stabilizer 10 in the direction D, the retention tabs 12*a,b* then snap into a (second) recess. This fixes the stabilizer 10 axially and laterally in the position shown in FIG. 6.

To retract the stabilizer 10, the sequence is reversed. The user compresses the two locking controls 11*a* and 11*b*, rotates the stabilizer into the retraction position and pushes the stabilizer 10 into the recess 16.

Another embodiment of the engagement means 17 and corresponding engagement recess 55 is illustrated in FIGS. 8 to 11. This embodiment provides a stronger construction than that previously described and may be used instead of, or in combination with, the alternative embodiments of the retention slot 14 described above.

Figure 8:
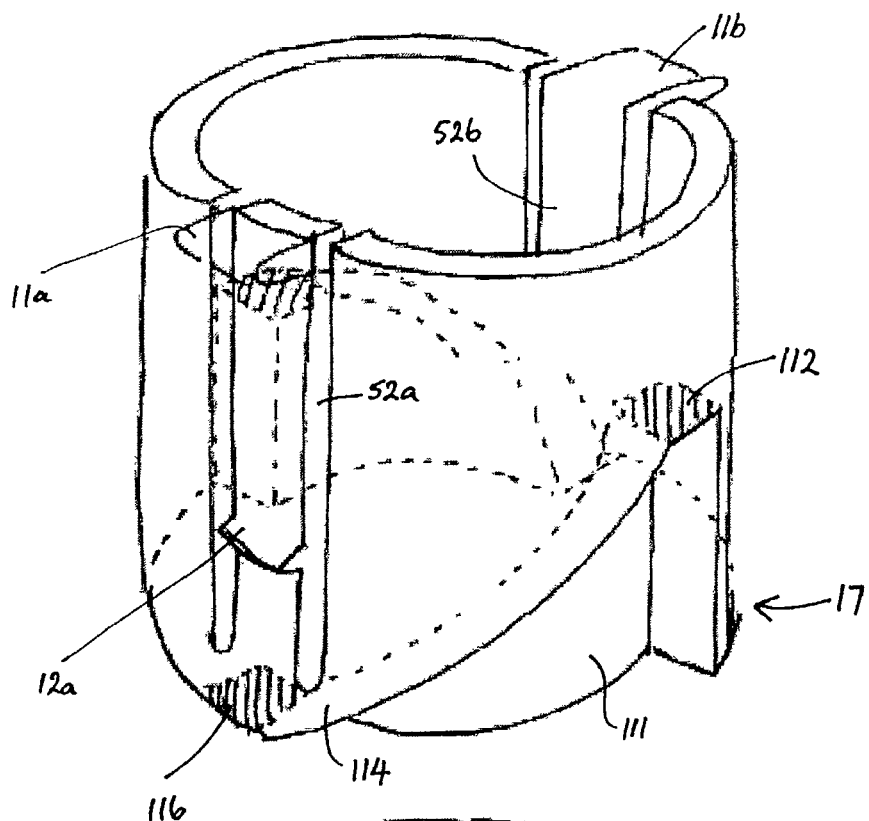
FIG. 8; illustrates a see-through view of an embodiment of a male part of an engagement means.
Figure 9:
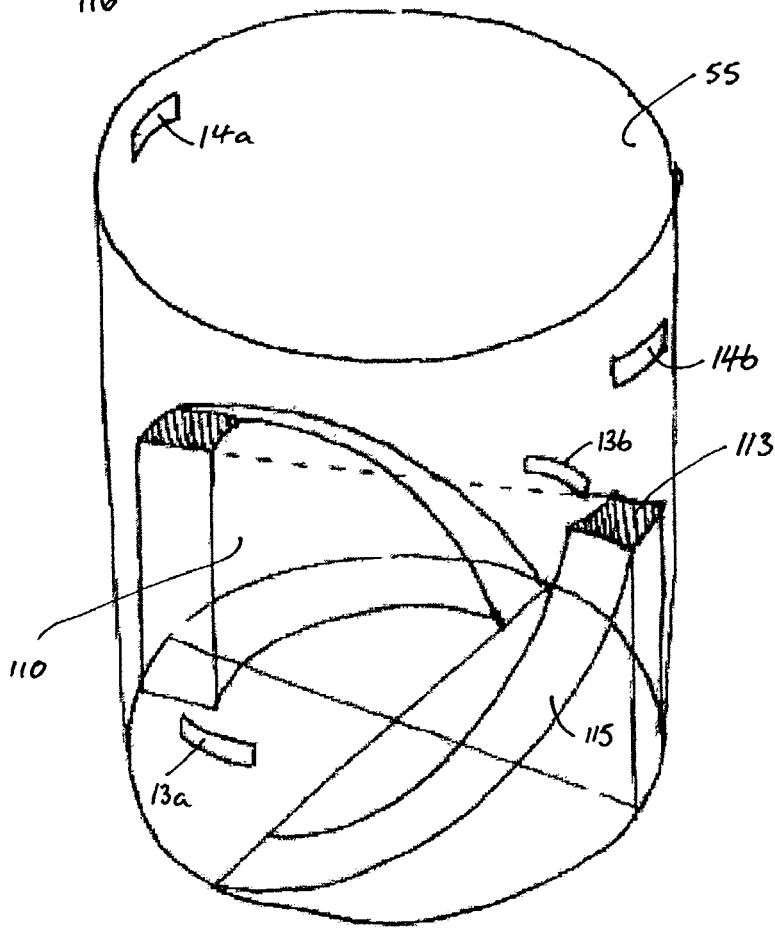
FIG. 9: illustrates a see-through view of an embodiment of a female part of an engagement means corresponding to the part shown in FIG. 8.

Referring to FIGS. 8 and 9, the engagement means 17 includes a partial thread 114 with a land 112 and 116 at either end. This partial thread 114 is formed by molding a cut away section 111 into the side wall of the engagement means 17. A corresponding partial thread is formed in the inside of the engagement surface 55. This is shown in FIG. 9. Each partial thread has a corresponding partner on the opposite side of the engagement means 17. For example, the pairs of partial threads are shown by the dotted and solid outlines in FIG. 8 and 9 respectively. The partial thread 115 in the engagement surface 55 coacts with the partial thread 114 formed in the engagement means 17 so as to cause the engagement means to rotate as it enters into the engagement recess 55. The surface 16 and the foot 10 are omitted for clarity in these two figures.

When the stabilizer 10 is configured in the recessed position, the engagement means 17 engages with the thread 115 so that the land 112 rests on top of the land 113. Land 116 rests on the lower surface of the recess 55. When the stabilizer 10 is rotated anticlockwise (when viewed from above), the interaction between the thread surfaces 115 and 114 result in the foot moving axially out of the recess 55. Once the foot is oriented at, for example, 90 degrees to its' stored orientation, the land 116 rests on the land 113. The retention tabs 12a,b snap into retention slots 14a,b and the weight of the PC thus rests, via the lands, on the molded interior of the surface 55. This construction will be significantly stronger that the situation described above where the full weight of the computer rests on the retention tabs. In certain situations, the molding in the engagement recess can be strengthened to suit the weight of the computer if desired.

An underside view of the engagement means 17 prior to insertion into the engagement surface 55 is shown in FIGS. 10 and 11. Here the partial thread formed by the surfaces 111, 114 of the engagement means 17 is visible as is the partial thread formed by the surfaces 115, 110 of the engagement recess 55. When the stabilizer 10 as a whole, is pressed into the recess 16, the retention tabs 12a,b slide down the inside surface of the engagement recess 55. As the stabilizer is pushed into the engagement recess 55, the partial threads cause it to rotate into a position whereby the retention tabs 12a,b snap into the retention slots 13a,b. This secures the stabilizer 10 in the stored position. To extract the stabilizer, the procedure outlined above is followed. Once the foot is extracted, the lands support the weight of the computer.

Figure 12:
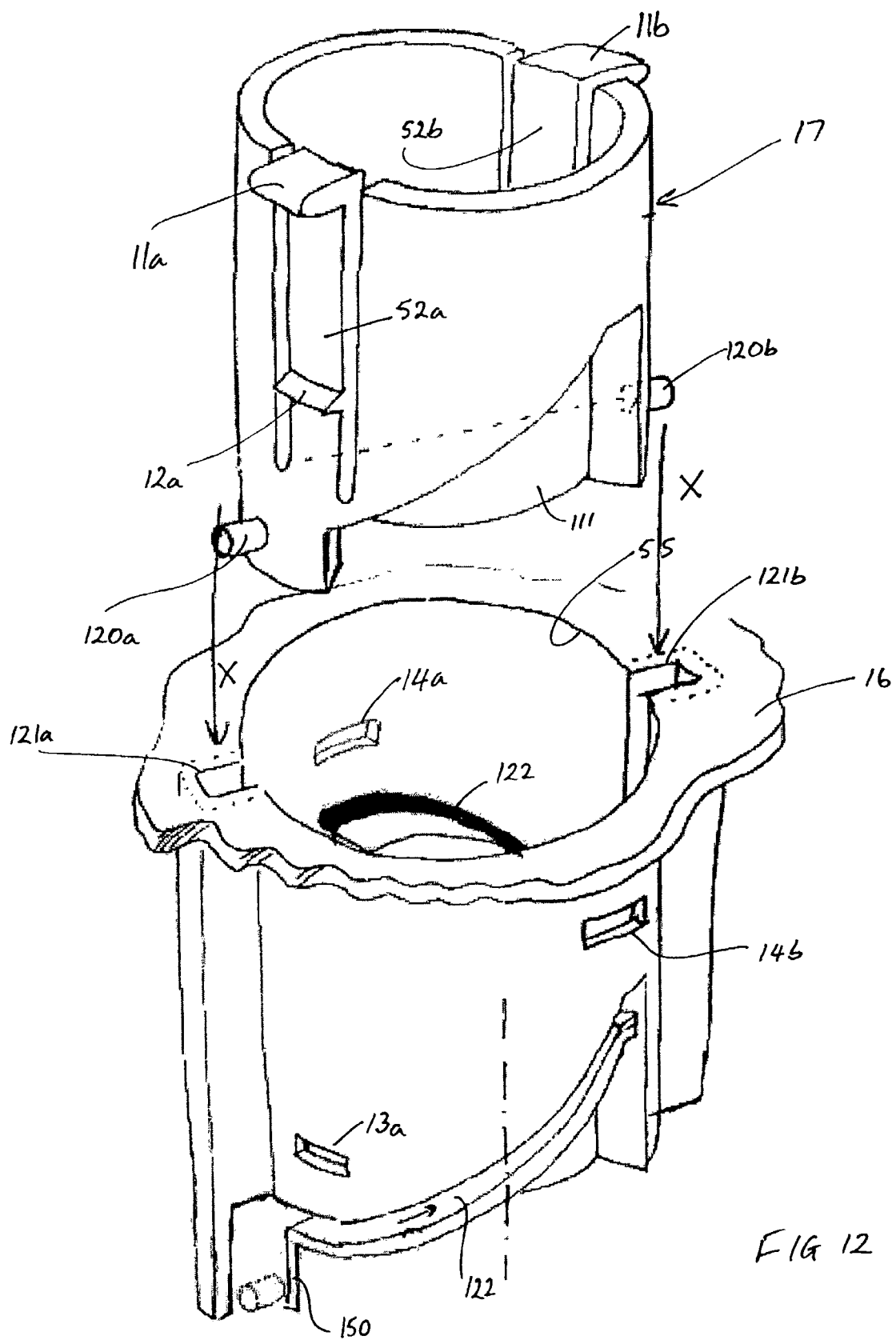
FIG. 12: illustrates a see-through view of a further embodiment of an engagement means including a location and locking slot.

A further embodiment is shown in FIG. 12. According to this embodiment, posts 120a,b and provided to assist in rotating and locating the engagement 17 means and thus the stabilizer 10 in the correct orientation in the engagement recess 55 for both storage and in the support position. During assembly of the computer casing, the engagement means 17 is inserted into the engagement recess 55 as shown by the arrows X, in FIG. 12. The posts 120a,b engage with slots 121a,b. The slots 121a,b and are oriented and function as follows. When the posts are inserted into the slots, the stabilizer 10 may be inserted into the recess 16. At a point where the foot is just short of being fully retracted, the posts are positioned so that they become free of the slots 121a,b. This is shown in FIG. 12, lower left. In this position, the foot is free to rotate slightly (anticlockwise when viewed from above), so that the post 120a rests against a portion 150. At this point, the foot may be slightly withdrawn whereby the post slides up the portion 150 and engages with the slot 122. If the foot 10 is withdrawn, either by manually or by means of a spring (not shown), the posts slide along slots 122. This causes the stabilizer 10 to rotate into the stabilizing orientation without the user manually rotating the stabilizer 10. When the stabilizer is properly oriented in the stabilizing position, the posts are aligned at the upper end of the slot 122. In this configuration, the engagement means including the partial thread operates as described above so that the weight of the PC is supported on the lands. A spring (not shown) may be used to bias the engagement means so that the overall effect is that when the user presses the engagement controls 11a,b together, the foot "automatically" extends and rotates into the required position and when the stabilizer is pressed axially into the recess 16, it rotates and retracts 'automatically'.

The orientation of the post, the portion, the locking tab 52 and the bottom of the slot 122 causes the post to be 'trapped' in the slot after its' initial insertion into the recess 55. To remove the stabilizer from the casing, the foot can be rotated backwards and then pulled out. This allows the post 120a,b to travel back up the slot 121a,b thereby releasing the foot 10. This operation would depend on the relative orientations and dimensions between the post 120a,b and, the slot 122a,b at the bottom right of the illustration in FIG. 12.

There are numerous possible shapes and configurations for the stabilizing means of the invention. Further, although a particular example has been shown with a single stabilizer mounted toward the front of a PC (see FIG. 6), other configurations of stabilizers, including multiple stabilizers, are possible.

Further, the stabilizer itself may be constructed with a different shape or proportion. Similarly, other shapes of control tab etc may be contemplated depending on the overall design of the PC and the particular style which is desired. As noted above, the locking slots may be constructed so as to have a two-stage locking and rotating action as well as 'automatic' extension and positioning functionality. This would depend on the type of retraction and locking that is required. Different locking tab constructions and biasing techniques may be possible which incorporate outwardly oriented key and keyway constructions biased by springs.

Thus it can be seen that the present invention provides for an aesthetically, appealing and compact design for a stabilizing mount for a computer. It is readily adaptable to modification to satisfy different designs and appearances. Multiple stabilizing mounts may be used and the invention an also be applied to similarly shaped and oriented computer hardware. A further advantage is that the foot can be universal as different computers can use the same integrated foot parts.

Although the invention has been described by way of example and with reference to particular embodiments it is to be understood that modification and/or improvements may be made without departing from the scope of the appended claims.

Where in the foregoing description reference has been made to integers or elements having known equivalents, then such equivalents are herein incorporated as if individually set forth.

The invention claimed is:

1. A chassis cover for a unit having a horizontal and vertical orientation, the chassis cover including:
    at least one wall panel having a surface and a width along the surface, the wall panel incorporating a recess in the surface; and
    a stabilizer having a foot with a length greater than the width of the wall panel, the stabilizer being adapted to be located in the recess, where the recess is adapted so that in a retracted position the foot of the stabilizer is entirely contained within the recess and does not extend beyond the width of the wall panel and, in an extended position, the foot of the stabilizer extends from the recess beyond the width of the wall panel, so as to stabilize the chassis when the chassis is mounted in a vertical orientation, wherein the stabilizer is moved into and locked into the extended position by means of a combined extension and rotation action with reference to a longitudinal axis of a cylindrically shaped engagement portion of the stabilizer connected to the foot, the cylindrically shaped engagement portion being disposed for rotational and reciprocal movement within a correspondingly shaped opening in the recess.

2. A chassis cover as claimed in claim 1 wherein the engagement portion incorporates one or more locking means which, when the stabilizer is in the retracted position, engages with a corresponding first retention means in an engagement surface defining the correspondingly shaped opening and, when in the stabilizer is in the extended position, engages with corresponding second retention means in the engagement surface.

3. A chassis cover as claimed in claim 2 wherein the one or more locking means is biased so that when said locking means are in registration with the first or second retention means, they are biased into engagement with the first or second retention means respectively.

4. A chassis cover as claimed in claim 2 wherein the one or more locking means engage with the first and second retention means by means of at least one protruding retention tab which is adapted to removably engage with said first and second retention means in the engagement surface.

5. A chassis cover for a unit having a horizontal and vertical orientation, the chassis cover including:
at least one wall panel having a surface and a width along the surface, the wall panel incorporating a recess in the surface; and
a stabilizer having a foot with a length greater than the width of the wall panel, the stabilizer being adapted to be located in the recess, where the recess is adapted so that in a retracted position the foot of the stabilizer is entirely contained within the recess and does not extend beyond the width of the wall panel and, in an extended position, the foot of the stabilizer extends from the recess beyond the width of the wall panel, so as to stabilize the chassis when the chassis is mounted in a vertical orientation, the stabilizer being mounted within the recess by means of an engagement portion connected to the foot adapted to engage with a correspondingly shaped engagement surface in the recess, the engagement portion including at least one locking means which, when the stabilizer is in the retracted position, engages with a corresponding first retention means in the engagement surface and, when the stabilizer is moved into and locked into the extended position by means of a combined extension and rotation action, engages with corresponding second retention means in the engagement surface, the at least one locking means including a locking control which:
when operated in the retracted position, disengages the at least one locking means from corresponding first retention means thereby allowing the stabilizer to be extracted from the recess and locked into the extended position by means of biased engagement of the locking means with corresponding second retention means; and
when operated in the extended position, disengages the at least one locking means from corresponding second retention means thereby allowing the stabilizer to be inserted into the recess and locked into the retracted position by means of biased engagement of the one or more locking means with corresponding first retention means.

6. A chassis cover for a unit having a horizontal and vertical orientation, the chassis cover including:
at least one wall panel having a surface and a width along the surface, the wall panel incorporating a recess in the surface; and
a stabilizer having a foot with a length greater than the width of the wall panel, the stabilizer being adapted to be located in the recess, where the recess is adapted so that in a retracted position the foot of the stabilizer is entirely contained within the recess and does not extend beyond the width of the wall panel and, in an extended position, the foot of the stabilizer extends from the recess beyond the width of the wall panel, so as to stabilize the chassis when the chassis is mounted in a vertical orientation, the stabilizer being mounted within the recess by means of an engagement portion connected to the foot, adapted to engage with a correspondingly shaped engagement surface in the recess, the engagement portion including at least one locking means which, when the stabilizer is in the retracted position, engages with a corresponding first retention means in the engagement surface and, when the stabilizer is in the extended position, engages with corresponding second retention means in the engagement surface,
wherein the stabilizer is moved into and locked into the extended position by means of a combined extension and rotation action, and
wherein the second retention means incorporates a first and second stage locking mechanism adapted so that when the at least one locking means engages with the first stage locking mechanism it is fixed in the extended position but able to rotate substantially freely so that when the stabilizer is rotated into a predetermined position it engages with the second stage locking mechanism and is locked in place.

7. A chassis cover for a unit having a horizontal and vertical orientation, the chassis cover including:
at least one wall panel having a surface and a width along the surface, the wall panel incorporating a recess in the surface; and;
a stabilizer having a foot with a length greater than the width of the wall panel, the stabilizer being adapted to be located in the recess, where the recess is adapted so that in a retracted position the foot of the stabilizer is entirely contained within the recess and does not extend beyond the width of the wall panel and, in an extended position, the foot of the stabilizer extends from the recess beyond the width of the wall panel, so as to stabilize the chassis when the chassis is mounted in a vertical orientation, wherein the stabilizer is moved into and locked into the extended position by means of a combined extension and rotation action,
the stabilizer and the recess each incorporating threaded sections adapted to engage in such a way that when the stabilizer is inserted into the recess, it rotates into a storage position without any user intervention.

8. A chassis cover as claimed in claim 1 wherein the engagement portion has a partial thread formed therein and adapted to engage in a slideable rotating engagement with a corresponding partial thread in the engagement surface.

9. A chassis cover as claimed in claim 7 wherein each threaded section incorporates at least one land adapted to transmit the weight of the unit to the stabilizer when the stabilizer is in the extended position.

10. A chassis cover as claimed in claim 7 wherein the stabilizer includes at least one post and the recess includes at least one corresponding first slot, the post and first slot adapted to engage so as to orient and position the stabilizer in both the retracted and extended position depending on the degree of retraction of the stabilizer from the recess.

11. A chassis cover as claimed in claim 10 wherein the at least one first slot forms a helical path which causes the stabilizer to rotate as it traverses the recess.

12. A chassis cover as claimed in claim 10, wherein the at least one post and the at least one corresponding first slot comprise two posts and two first slots located on opposite sides of the engagement portion, the post and first slot adapted to engage so as to orient and position the stabilizer in both the retracted and extended position depending on the degree of retraction of the stabilizer from the recess.

13. The chassis cover according to claim 1 wherein the foot extends on either side of the width of the wall panel when the stabilizer is in the extended position.

14. The chassis cover according to claim 5 wherein the foot extends on either side of the width of the wall panel when the stabilizer is in the extended position.

15. The chassis cover according to claim 6 wherein the foot extends on either side of the width of the wall panel when the stabilizer is in the extended position.

16. The chassis cover according to claim 7 wherein the foot extends on either side of the width of the wall panel when the stabilizer is in the extended position.

17. A chassis cover as claimed in claim 12 including second slots traversing the length of the recess and adapted to engage corresponding posts so as to orient the stabilizer for location in the recess whereupon a small rotation of the stabilizer causes the posts to engage with the corresponding first slots.

18. A chassis cover as claimed in claim 17 wherein the second slots are positioned so that the posts do not re-engage with the first slots if the stabilizer is retracted in a non-rotating manner.

* * * * *